3,285,831
CITRIC ACID PRODUCTION

Earl Jack Swarthout, Edwardsburg, Mich., assignor to Miles Laboratories, Inc., Elkhart, Ind., a corporation of Indiana
No Drawing. Filed Mar. 27, 1964, Ser. No. 355,499
3 Claims. (Cl. 195—36)

This invention relates to a process for the production of citric acid. More particularly, it relates to a process of employing an improved dual enzyme converted crude starch material as the fermentation substrate for producing critic acid.

It is known in the art that citric acid can be produced in commercial quantities by the fermentation of carbohydrate materials using various strains of citric acid producing fungi. Certain strains of *Aspergillus niger* have proved to be particularly useful for this purpose. In addition, various strains of other species of fungi, such as *Aspergillus clavatus, Aspergillus wentii, Aspergillus luchuensis, Penicillium citrinum, Penicillium luteum* and the like, have been used with varying degrees of success.

While the prior art has mentioned that crude carbohydrate materials, such as invert sugars, aqueous vegetable extracts containing sugar, partially refined sucrose sources and the like, can be employed as the fermentation substrate for citric acid production, all of the practical and most useful processes have employed high quality fermentable sugar materials, such as refined sucrose, dextrose, high-test cane syrup and the like. Whenever crude materials have been employed in the prior art, the yield of citric acid has been drastically reduced over that obtained from high-test or refined sources.

The prior art has also suggested the use of starch hydrolyzates as a fermentation substrate for citric acid. The art has generally meant starch hydrolyzates obtained from highly refined starches. It is well known that starch, such as corn starch, can be hydrolyzed to form sugars, such as dextrose. Acids, such as hydrochloric acid, have been widely used to catalyze such hydrolysis. Such "acid-converted" starch products have the disadvantage, however, that large amounts of generally undesirable dextrins are produced. Such dextrins lower the overall yield of desirable fermentable sugars, such as dextrose and maltose. It is also known that acid-converted starch products contain undesirable amounts of reversion sugars, such as gentiobiose, isomaltose, panose and the like. These reversion sugars are unfermentable by yeast, for example, and reduce the utility of acid-converted starch products as fermentation substrates.

In an effort to overcome the disadvantages of acid conversion, the art substituted an enzyme conversion. Enzymes, such as alpha-amylase and amyloglucosidase, were employed to catalyze the starch hydrolysis. Enzyme converted syrups, for example, possess a distinct advantage over acid-converted syrups. The enzyme converted syrups contain substantially no dextrins, desirable low amounts of reversion sugars, and at least as much and generally more dextrose than is produced by acid-conversion. In order for the enzymes to be most effective in converting the starch to desirable sugars, the starch must be somewhat liquefied. Such liquefaction can be accomplished by partial acid-conversion, as described above, or by an enzyme conversion. The dual enzyme processes of the prior art have employed an amylase to liquefy the starch and an amyloglucosidase to convert the starch to sugar. Such prior art processes still had disadvantages, however. Acid-conversion, even when employed only for liquefaction of the starch, could not be employed with crude starch materials since the acid would convert the non-starch components of such materials to undesirable products. Acid catalyzed processes have therefore been limited to production of starch hydrolyzates from substantially pure starch materials. Even when dual enzyme processes were employed in the prior art, they were likewise limited to production of starch hydrolyzates from substantially pure starch materials since the enzymes were contaminated with undesirable enzymes, such as lipase, protease, transglucosidase and the like, which catalyzed the formation of undesirable products from crude starch materials.

It is an object of the present invention to provide a process for obtaining citric acid in high yields from crude starch-containing materials.

It is another object of the present invention to provide a fermentation process for obtaining citric acid in high yields from crude starch-containing materials wherein a dual enzyme process is employed in the formation of the fermentation substrate.

In accordance with the present invention, a process is provided which comprises subjecting a mixture of water and crude starch-containing material to the action of an amylase at a temperature of about 160° F. to about 195° F. and at a pH of about 6.5 to about 7.7 for at least about 20 minutes to liquefy substantially all the starch in said crude material, cooling the liquefied starch solution to a temperature of about 130° F. to about 145° F., adjusting the pH of said solution to a value of about 4.0 to about 5.5, adding to said solution an amyloglucosidase which is substantially free from protease, lipase and transglucosidase activity, maintaining the resulting mixture at a temperature of about 130° F. to about 145° F. for about 15 to about 96 hours to convert the liquefied starch to desired sugars, removing insoluble material from the solution, and subjecting the resulting solution to the action of a citric acid producing strain of a fungus in the presence of nutrients for said fungus under conditions conducive to fermentation until a predetermined amount of citric acid is produced.

The crude starch-containing materials employed in the process of the present invention can be selected from a broad class of crude products. Crude starches from corn, wheat, potatoes and the like can be used. Various streams from both wet and dry corn milling processes can also be used. These streams include such materials as starch liquors, hominy feed, hominy grits, ground whole corn, corn flour, brewer's grits or wet cereal milling fractions, such as Dorrcone centrifuge streams, clarifier underflow and degermed primary mill stream slurries. Various other crude starchy materials with which the art is familiar can likewise be used.

Liquefaction of the crude starch-containing material is accomplished by subjecting a mixture of water and such material to the action of an amylase. This mixture of water and crude starch material, such as corn flour, contains about 1.25 to about 3.0 lb. of water per pound of crude starch material dry solids. Preferably the mixture contains about 1.3 to about 1.6 lb. of water per pound of crude starch material dry solids. The amylase obtained from either fungal or bacterial sources is well known in the art and is prepared by well known procedures. The amylase is preferably alpha-amylase. This amylase should be used in an amount equivalent to from about 0.06 to about 0.15 weight percent based on the weight of dry solids in the crude starch material of an amylase having a concentration or potency such that 1 mg. of emzyme will produce about 100 mg. of maltose from 1000 mg. of starch under standard assay conditions. The standard assay conditions are: 1000 mg. soluble starch in a 2 weight percent aqueous solution; pH 5.4; 40° C.; 30 minutes incubation; enzyme solution to be tested of such concentration that 1 ml. will catalyze hydrolysis of 20–30 weight percent of the starch during the 30-minute period. The maltose content of the enzyme converted starch is determined by the well known Schoorl method. Preferably the amylase is used in an amount equivalent to from about 0.09 to about 0.11 weight percent of an amylase of the above described potency.

The crude starch is treated with the liquefying amylase at a temperature of about 160° F. to about 195° F. (about 72° C.–90° C.) for at least about 20 minutes at a pH of about 6.5 to about 7.7. This pH value can be attained by well known techniques, such as addition of calcium hydroxide. Preferably, the crude starch is treated with the liquefying amylase at a temperature of about 185° F. to about 195° F. (about 85° C.–90° C.) for about 25 to about 45 minutes at pH of about 6.9 to about 7.7. When the process is carried out under these conditions, the subsequent saccharification conversion efficiency is improved, the results are more uniform and reproducible, and liquefaction is more complete.

Saccharification, or conversion of the liquefied crude starch material to dextrose, is brought about by cooling the liquefied crude starch material to a temperature of about 130° F. to about 145° F., (about 54° C.–63° C.), adjusting the pH to a value of about 4.0 to about 5.5 by well known techniques, such as by addition of sulfuric acid, adding to said solution an amyloglucosidase which is substantially free from protease, lipase, and transglucosidase activity, and maintaining the resulting mixture at a temperature of about 130° F. to about 145° F. for about 15 to about 96 hours. Preferably, saccharification is accomplished by cooling the liquefied crude starch material to a temperature of about 138° F. to about 140° F. (about 59° C.–60° C.), adjusting the pH to a value of about 4.8 to about 5.1, adding to said solution an amyloglucosidase which is substantially free from protease, lipase and transglucosidase activity, and maintaining the resulting mixture at a temperature of about 138° F. to about 140° F. for about 15 to about 45 hours. When a temperature below about 138° F. is employed, activity of the enzyme is retarded resulting in decreased yield of dextrose and consequent decrease in yield of citric acid. Also the lower temperatures allow contaminating microorganisms to grow and produce undesirable products. At temperatures above about 140° F. the enzyme is degraded irreversibly and again yields of dextrose are reduced as well as consequent yields of citric acid.

The amyloglucosidase is employed in a concentration or potency of about 60 to about 95 units per pound of crude starch dry solids. A unit is the amount of enzyme that will catalyze the production of one gram of dextrose in one hour under standard assay conditions. Thus, a concentration of 60–95 units of enzyme will produce 60–95 grams of dextrose in one hour under standard assay conditions. The standard assay conditions are 20 g. of soluble starch in a 4 weight percent aqueous solution; pH 4.2 with sodium acetate-acetic acid buffer; 60° C.; 1 hour incubation; enzyme solution to be tested of such concentration that 1 ml. will catalyze hydrolysis of 20–30 weight percent of the starch during the 1 hour period. The dextrose content of the enzyme converted starch is determined by the well known Schoorl method. Preferably, the amyloglucosidase is employed in a concentration or potency of about 85 to about 95 units per pound of crude starch dry solids.

The amyloglucosidase which is useful in the present invention is substantially free from protease, lipase and transglucosidase activity. Such amyloglucosidase can be obtained through a refining treatment of a crude amyloglucosidase fungal extract liquor obtained from certain fungi, such as *Aspergillus niger*, members of the *Aspergillus niger* group, *Rhizopus oryzae*, *Rhisopus nigricans*, *Rhizopus reflexus*, *Rhizopus microsporis* and the like. The crude liquor is obtained by well known fermentation techniques. Alternatively, some strains of *Aspergillus niger* fungi are known to produce a culture liquor containing amyloglucosidase which is substantially free from protease, lipase and transglucosidase activity. When such strains of fungi are employed, the resulting crude culture liquor can be used, without the necessity for subsequent refining, for saccharification in the present novel process.

The refining of crude amyloglucosidase, when needed, can be carried out by methods known in the prior art. Selective inorganic adsorbents, such as silicates, bentonite and the like; selective inorganic salt solutions, such as sodium chloride, ammonium sulfate and the like; and selective liquid organic solvents may be used in various combinations to attain the necessary degree of amyloglucosidase purity. In the case of organic solvents, any selective organic liquid solvent which dissolves amyloglucosidase, but does not dissolve transglucosidase, protease, lipase or other amylases, and simultaneously is incapable of irreversibly inactivating amyloglucosidase, is suitable. Examples of such selective organic solvents are acetone and isopropanol. The use of organic solvents and bentonite for amyloglucosidase refining is disclosed by Underkofler and Vincente in Iowa State College Journal of Science, 30, 445 (1956). Separation of proteases from amylases by adsorbing the proteases on aluminum silicate is disclosed by Dirks and Miller in Cereal Chemistry, March 1949, pp. 98–109. U.S. Patent No. 2,121,459 describes the removal of proteases from amylase in enzyme mixtures obtained from matted grains, molds, or bacteria. This is accomplished by the selective adsorption of protease with various aluminum oxides, such as bauxite. In general, any reagent or reagent combination which does not deleteriously affect the enzymatic activity or the water solubility of amyloglucosidase but which acts as a selective material to separate non-amyloglucosidase enzymes from non-refined amyloglucosidase may be used to produce a refined amyloglucosidase which is capable of functioning in accordance with the present invention. The particular combination of refining reagents and refining steps which would be used to obtain an amyloglucosidase of satisfactory purity will depend upon the individual economy of the production of the crude amyloglucosidase liquor.

Crude starch materials often contain water-insoluble materials, such as fibers, gluten and the like, which must be removed before the enzyme converted crude material is employed as a citric acid fermentation substrate. These insolubles can be removed by any convenient well known technique, such as filtration, decantation after gravity settling, centrifugation, flocculation and the like.

It is well known in the citric acid art that the fermentation substrate should be acidified and then decationized by passing through a cationic ion exchange material. Such treatment is also given to the above described liquefied and saccharified solution obtained from crude starch materials. The general process conditions for carrying out the citric acid fermentation are described, for example, in U.S. Patents Nos. 2,476,159 of L. B. Schweiger et al.; 2,492,667 of R. L. Snell et al.; 2,492,673 of J. C. Woodward et al.; 2,916,420 of L. B. Schweiger; 2,970,084 of L. B. Schweiger and 3,083,144 of M. W. Shepard. Such process conditions are followed in carrying out the present invention which relates principally to an improvement in the preparation of the fermentation substrate to produce high yields of citric acid from crude starch materials.

The invention will be further described in the following examples.

*Example 1*

Clarifier underflow from a corn wet milling process (containing starch, fibers and gluten) was filtered and washed with water. The filter cake reslurried in water to form a mixture containing 35 weight percent solids (1.85 lb. water per pound of dry solids). Calcium hydroxide was added to the slurry to adjust the pH to 6.9–7.0. Bacterial alpha-amylase having a potency such that 1 mg. of the enzyme will produce 100 mg. of maltose under standard assay conditions was added in an amount of 0.1 weight percent based on the weight of dry solids in the slurry. The resulting mixture was then heated to 185° F.–194° F. and maintained at this temperature for 30 minutes with mechanical agitation. The liquefied crude starch material was then cooled to 134° F.–138° F. The pH was adjusted to 4.7–4.9 with sulfuric acid. An amyloglucosidase solution substantially free from protease, lipase and transglucosidase activity was added in an amount of 72 units per pound of dry solids in the liquefied crude starch and the resulting mixture was maintained at 134° F.–138° F. for 86 hours until the yield of desirable sugars reached 98 percent of theory. This product was then adjusted to pH 3.4 with phosphoric acid, reheated to 190° F. and filtered. The filtrate was defecated by adding lime to pH 7 and filtering. The filtrate was adjusted to pH 2.1–2.3 with sulfuric acid and decationized by passing through a bed of Nalcite HCRX8 cationic ion exchange material. This is a sulfonic type strongly acid cation exchange resin marketed by the National Aluminate Corp. The following nutrients were then added to the decationized fermentation substrate: $KH_2PO_4$, 0.015 percent; $MgSO_4 \cdot 7H_2O$, 0.1 percent; $CuSO_4$, 0.2 p.p.m. $Cu^{++}$; $ZnSO_4$, 0.2 p.p.m. $Zn^{++}$; $CaCl_2$, 50 p.p.m. $Ca^{++}$; ammonia to adjust to pH 2.81 (60 pounds). The total volume of nutrients and fermentation substrate was 16,321 gallons. Total fermenter capacity was 19,000 gallons. The fermenter contents were inoculated with citric acid producing strains of *Aspergillus niger* and the fermentation began. On the fourth and fifth days of fermentation 15 pounds ammonia were added and on the sixth and seventh days 30 pounds ammonia were added for a total of 90 pounds of added ammonia nutrient. During this period 500 gallons of sugar syrup prepared by the above described dual enzyme process and which had been defecated and decationized were also added to the fermenter contents. This was a submerged aerated fermentation. After 8.5 days the yield of citric acid was 85.2 weight percent based on the sugar supplied. Comparable fermentations employing starch hydrolyzates obtained from prior art hydrolysis techniques have produced lower yields of citric acid and have required longer fermentation times. Even use of high test sugar solutions as fermentation substrates has often required longer fermentation times to obtain comparable yields of citric acid. For example, commercially refined glucose used as a fermentation substrate produced only a 65 weight percent yield of citric acid after 9 days and 19 hours of fermentation. Such refined material required 13 days and 19 hours of fermentation to produce a citric acid yield of 89.8 weight percent based on sugar supplied.

*Example 2*

A 1500-pound quantity of corn flour (a crude material containing starch, fibers and gluten) was mixed with 240 gallons of water to form a slurry containing 1.35 lb. of water per pound of crude material dry solids. Calcium hydroxide was added in an amount of 960 g. to the slurry to adjust the pH to 7.7. Bacterial alpha-amylase having a potency such that 1 mg. of enzyme will produce 100 mg. of maltose under standard assay conditions was added to the slurry in an amount of 680 g. (0.1 weight percent based on weight of crude starch dry solids in the slurry). The resulting mixture was then heated to 185° F.–195° F. for 44 minutes and then maintained at a temperature of 190° F.–194° F. for an additional 35 minutes accompanied by mechanical agitation. The liquefied crude starch material was then cooled to 140° F. The pH was adjusted to 5.1 by adding 800 ml. of sulfuric acid. Amyloglucosidase substantially free from protease, lipase and transglucosidase activity was added in an amount of 72.5 units per pound of dry solids in the liquefied corn flour, and the resulting mixture was maintained at 140° F. for 70 hours. Three separate 30-liter portions of the above liquefied and saccharified mixture were removed after 18, 40 and 70 hours, respectively, of heating in the presence of the amyloglucosidase. Each portion was centrifuged to remove insolubles and the supernatant liquor was defecated by adding 3 ml. phosphoric acid per liter of liquid and adding lime to a pH of 7.4, heating to 180° F. and filtering. The filtrate was diluted with cold tap water to a mixture containing 20–21 weight percent solids, adjusted to pH of 2.1 with sulfuric acid, heated to 120° F. and passed through a 0.05 cu. ft. bed of 20 x 50 mesh particles of Nalcite HCR cationic ion exchange material. The 17 liters of decationized effluent had a pH of 1.50–1.56. This pH value was adjusted to 2.90–2.94 by addition of 40–47.5 ml. of $NH_4OH$. Nutrients were added to the effluent in amounts of 0.014 weight percent $KH_2PO_4$, 0.1 weight percent $MgSO_4 \cdot 7H_2O$, and 50 parts per million (p.p.m.) by weight $Ca^{++}$ ions as $CaCl_2 \cdot 2H_2O$. This mixture was autoclaved for 8 minutes at 255° F. and 18 p.s.i.g. to sterilize it. This fermentation substrate and nutrient mixture was then cooled to room temperature. A 4-liter quantity of this liquid was charged to a vertical aerated fermenter. To this liquid were added 0.15 p.p.m. by weight $Cu^{++}$ ions as $CuSO_4 \cdot 5H_2O$, 0.15 p.p.m. by weight $Zn^{++}$ ions as $ZnSO_4 \cdot 7H_2O$ and 0.1 p.p.m. by weight $Fe^{+++}$ ions as ferric ammonium citrate. Aeration was started at 1.50–1.75 volumes air/volume fermenter/minutes. The fermenter contents were then inoculated with 3 ml. of an aqueous suspension of *Aspergillus niger* spores. The fermenter was heated to 86° F.–90° F. (30° C.–32° C.) and aeration continued at the above rate for 24 hours. The aeration was then increased to 1.75–2.0 volumes air/volume fermenter/minutes. The above detailed procedure was followed for the fermentation of the above described samples obtained at 18, 40 and 70 hours of treatment with amylglucosidase. The following description relates only to the 18-hour sample. After 66 hours of fermentation, 2.5 ml. of concentrated ammonium hydroxide were added to maintain desired pH and desired nitrogen nutrient level. Concentrated ammonium hydroxide was also added in amounts of 3.3 ml. after total fermentation times of 113 hours and 139 hours, respectively. The fermentation was stopped after 306 hours. Titration of the fermentation products with NaOH indicated that citric acid was obtained in an 81.0 weight percent yield base on total sugars supplied in the fermentation substrate.

*Example 3*

The 40-hour sample described in Example 2 above was converted into a fermentation substrate-nutrient mixture as described in Example 2 above. The fermentation substrate-nutrient mixture was inoculated and fermentation commenced also in accordance with the description of Example 2 above. After 66 hours of fermentation, 2.5 ml. of concentrated ammonium hydroxide were added. Concentrated ammonium hydroxide was also added in amounts of 3.3 ml. after total fermentation times of 92 hours and 163 hours, respectively. The fermentation was stopped after 259 hours. Titration of the fermentation products with NaOH indicated that citric acid was obtained in a 91.0 weight percent yield based on total sugars supplied in the fermentation substrate.

*Example 4*

The 70-hour sample described in Example 2 above was converted into a fermentation substrate-nutrient mixture as described in Example 2 above. The fermentation substrate-nutrient mixture was inoculated and fermentation commenced also in accordance with the description of Example 2 above. After 66 hours of fermentation, 2.5 ml. of concentrated ammonium hydroxide were added. Concentrated ammonium hydroxide was also added in amounts of 3.33 ml. after total fermentation times of 92 hours and 163 hours, respectively. The fermentation was stopped after 259 hours. Titration of the fermentation products with NaOH indicated that citric acid was obtained in a 93.0 weight percent yield based on total sugars supplied in the fermentation substrate.

The above examples all clearly show improved yields of citric acid obtainable by using as a fermentation substrate the product resulting from a specific dual enzyme conversion process.

In summary, the present invention relates to an improved process of producing citric acid from a fermentation substrate which has been prepared by specific dual enzyme conversion of crude starch materials.

What is claimed is:

1. A process for producing citric acid which comprises subjecting a mixture of water and crude starch-containing material, wherein the mixture contains about 1.3 to about 1.6 lb. of water per pound of crude starch material dry solids, to the action of an amylase at a temperature of about 160° F. to about 195° F. and at a pH of about 6.5 to about 7.7 for at least about 20 minutes to liquefy substantially all the starch in said crude material, cooling the liquefied starch solution to a temperature of about 130° F. to about 145° F., adjusting the pH of said solution to a value of about 4.0 to about 5.5, adding to said solution an amyloglucosidase which is substantially free from protease, lipase and transglucosidase activity, maintaining the resulting mixture at a temperature of about 130° F. to about 145° F. for about 15 to about 96 hours to convert the liquefied starch to desired sugars, removing insoluble material from the solution, and subjecting the resulting solution to the action of a citric acid producing strain of a fungus in the presence of nutrients for said fungus under conditions conductive to fermentation until a predetermined amount of citric acid is produced.

2. A process for producing citric acid which comprises subjecting a mixture of water and crude starch-containing material, wherein the mixture contains about 1.3 to about 1.6 lb. of water per pound of crude starch material dry solids, to the action of an alpha-amylase, wherein the alpha-amylase is used in an amount equivalent to from about 0.09 to about 0.11 weight percent based on the weight of crude starch material dry solids of an amylase having a potency such that 1 mg. of enzyme will produce about 100 mg. of maltose from 1000 mg. of starch under standard assay conditions, at a temperature of about 185° F. to about 195° F. and at a pH of about 6.9 to about 7.7 for about 25 to about 45 minutes to liquefy substantially all the starch in said crude starch-containing material, cooling the liquefied starch solution to a temperature of about 138° F. to about 140° F., adjusting the pH of said solution to a value of about 4.8 to about 5.1, adding to said solution about 60 to about 95 units per pound of crude starch dry solids of an amyloglucosidase which is substantially free from protease, lipase and transglucosidase activity, maintaining the resulting mixture at a temperature of about 138° F. to about 140° F. for about 15 to about 45 hours to convert the liquefied starch to desired sugars, removing insoluble material from the solution, and subjecting the resulting solution to the action of a citric acid producing strain of a fungus in the presence of nutrients for said fungus under conditions conducive to fermentation until a predetermined amount of citric acid is produced.

3. In a process for the production of citric acid which comprises subjecting a fermentation substrate to the action of a citric acid producing strain of a fungus in the presence of nutrients for said fungus under conditions conducive to fermentation until a predetermined amount of citric acid is produced, the improvement which comprises using as the fermentation substrate the product obtained by subjecting a mixture of water and crude starch-containing material, wherein the mixture contains about 1.3 to about 1.6 lb. of water per pound of crude starch material dry solids, to the action of an alpha-amylase, wherein the alpha-amylase is used in an amount equivalent to from about 0.09 to about 0.11 weight percent based on the weight of crude starch material dry solids of an amylase having a potency such that 1 mg. of enzyme will produce about 100 mg. of maltose from 1000 mg. of starch under standard assay condtions, at a temperature of about 185° F. to about 195° F. and at a pH of about 6.9 to about 7.7 for about 25 to about 45 minutes to liquefy substantially all the starch in said crude starch-containing material, cooling the liquefied starch solution to a temperature of about 138° F. to about 140° F., adjusting the pH of said solution to a value of about 4.8 to about 5.1, adding to said solution about 60 to about 95 units per pound of crude starch dry solids of an amyloglucosidase which is substantially free from protease, lipase and transglucosidase activity, maintaining the resulting mixture at a temperature of about 138° F. to about 140° F. for about 15 to about 45 hours to convert the liquefied starch to desired sugars, and removing insoluble material from the solution.

References Cited by the Examiner

UNITED STATES PATENTS

| 2,492,667 | 12/1949 | Snell et al. | 195—36 |
| 2,970,084 | 1/1961 | Schweiger | 195—36 |
| 3,039,936 | 6/1962 | Lenney et al. | 195—11 |
| 3,042,584 | 7/1962 | Kooi et al. | 195—31 |
| 3,108,928 | 10/1963 | Kathrein | 195—31 |

A. LOUIS MONACELL, *Primary Examiner.*

L. M. SHAPIRO, *Assistant Examiner.*